(12) United States Patent
Zen et al.

(10) Patent No.: US 8,515,183 B2
(45) Date of Patent: Aug. 20, 2013

(54) UTILIZING IMAGES AS ONLINE IDENTIFIERS TO LINK BEHAVIORS TOGETHER

(75) Inventors: Lee-Ming Zen, Cambridge, MA (US); Valeri Liborski, Redmond, WA (US); Gerard Gjonej, Redmond, WA (US); Teresa Mah, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 264 days.

(21) Appl. No.: 12/974,184

(22) Filed: Dec. 21, 2010

(65) Prior Publication Data
US 2012/0155776 A1 Jun. 21, 2012

(51) Int. Cl.
*G06K 9/64* (2006.01)
(52) U.S. Cl.
USPC .......................................... 382/217; 382/197
(58) Field of Classification Search
None
See application file for complete search history.

(56) References Cited

U.S. PATENT DOCUMENTS

| | | | |
|---|---|---|---|
| 7,657,126 B2 * | 2/2010 | Gokturk et al. | 382/305 |
| 8,315,442 B2 * | 11/2012 | Gokturk et al. | 382/118 |
| 2002/0161747 A1 * | 10/2002 | Li et al. | 707/3 |
| 2006/0251338 A1 * | 11/2006 | Gokturk et al. | 382/305 |
| 2007/0124291 A1 | 5/2007 | Hassan | |
| 2008/0130960 A1 | 6/2008 | Yagnik | |
| 2009/0222395 A1 | 9/2009 | Light | |
| 2009/0222431 A1 | 9/2009 | Kumar | |
| 2010/0057772 A1 | 3/2010 | Manolescu | |

OTHER PUBLICATIONS

Bnode, "Linked Data Entity Extraction with Zemanta and OpenCalais", Benjamin Nowack's Blog, printed from the Internet Sep. 17, 2010, 6 pages, http://bnode.org/blog/2010/07/28/linked-data-entity-extraction-with-zemanta-and-opencalais.

Kyung-Joong Kim, et al., "Conceptual Information Extraction with Link-Based Search", Web Intelligence: Research and Development, Lecture Notes in Computer Science, 2001, vol. 2198/2001, 367-372, DOI: 10.1007/3 540-45490-X_45, 2 pages printed from the Internet Sep. 17, 2010, http://www.springerlink.com/content/1q1wglf44867d5jb.

Dan McCreary, "Entity Extraction and the Semantic Web", SEMANTICUNIVERSE: Educating the World About Semantic Technologies and Applications, Jan. 12, 2009, printed from the Internet Sep. 17, 2010, 5 pages, http://www.semanticuniverse.com/articles-entity-extraction-and-semantic-web.html.

Alexis Morris, et al., "Entity Identification on the Semantic Web", University of Trento, partially funded by EU grant ICT-215032, Published 2008, 10 pages, http://disi.unitn.eu/~velgias/papers/MorrisVB08.pdf.

* cited by examiner

*Primary Examiner* — Bhavesh Mehta
*Assistant Examiner* — Siamak Harandi
(74) *Attorney, Agent, or Firm* — Shook, Hardy & Bacon L.L.P.

(57) ABSTRACT

Systems, methods, and computer storage media having computer-executable instructions embodied thereon that utilize images to generate identifiers of entities and to determine various relationships between entities and web pages are described. A collection of class images that represent various people and non-people entities deemed relevant for tracking user behavior is generated. Given a class image that represents an entity, an image identifier comprising unique feature vectors for that class image is generated. Given an arbitrary web page, all the images embedded on the web page are analyzed. Each embedded image is compared to the image identifiers of the collection of class images to determine whether or not any entities of interest appear in the embedded images of the web page. If relevant entities do appear on the web page, various associations can be made between the entities found on the page, and between the uniform resource locator (URL) of the web page where the entities appear.

17 Claims, 4 Drawing Sheets

UTILIZING IMAGES AS ONLINE IDENTIFIERS TO LINK BEHAVIORS TOGETHER

BACKGROUND

It is generally difficult to determine whether a particular entity is associated with other entities or URLs on the web. For instance, given various entities such as a particular physical object, location or person, it is not easy to determine the web pages a particular individual has visited or has a presence on, nor is it easy to determine whether or not a location or physical object is mentioned on a web page. Furthermore, it is difficult to establish if and/or how those various entities are related to each other.

With regard to people entities, the use of tagging beacons on web pages along with cookies may help to determine whether or not a specific user has interacted with a web page. By dropping a cookie on the user's machine, placing beacons on web pages, and looking at cookies as they hit beacons, companies may track user behavior wherever they can place beacons. Typically companies are not able to beacon the web pages of another company without an agreement. As such, in cases where no agreement exists to facilitate beaconing a web page, it is virtually impossible to track user behavior. Furthermore, this method of determining user to webpage association is limited as the user must maintain the same cookie for the user tracking method to be successful. That is, the difficulty of tracking user behavior is exacerbated in situations where a single user maintains multiple identities across different services or URLs on the web.

In the case of non-people entities, determining whether a particular entity is associated with a URL on the web generally involves performing information extraction on a web page to determine what the relevant entities within the text of the web page are. Certain URLs may refer to a specific concept or entity and uses and/or mentions of those URLs on other web pages may indicate the presence of that specific entity on the web page. For example, a Wikipedia URL might refer to a specific location in the world and a travel web page may use the Wikipedia URL indicating the presence of that specific location entity on the travel web page. This method of determining entity to webpage association is limited in that a particular entity may be associated with a webpage without being explicitly mentioned in the text of the webpage and therefore missed by the information extraction process.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer-readable media for, among other things determining entity associations utilizing images. Various aspects of the technology described herein are generally directed to utilizing images to generate identifiers of entities and to determine various relationships between entities and web pages. An entity refers to something in existence and may include among other things, a physical object, location, or person. A collection or corpus of class images that represent various people and non-people entities deemed relevant for tracking user behavior is generated. Given a class image that represents an entity, an image identifier comprising unique feature vectors for that class image is generated. Several image identifiers that correspond to the collection of class images are generated. Given an arbitrary web page, all the images embedded on the web page are analyzed. Each embedded image is compared to the image identifiers of the corpus of class images to determine whether or not any entities of interest appear in the embedded images of the web page. If relevant entities do appear on the web page, various associations can be made between the entities found on the page, and between the uniform resource locator (URL) of the web page where the entities appear.

BRIEF DESCRIPTION OF THE DRAWINGS

The present invention is illustrated by way of example and not limited in the accompanying figures in which like reference numerals indicate similar elements and in which.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-readable media for, among other things, determining entity associations utilizing images. As used herein an entity refers to something in existence and may include among other things, a physical object, location, or person. As used herein the term image refers to a block of pixels containing a representation of a physical entity. As such, a picture or photograph may include several images. A collection or corpus of class images that represent various people and non-people entities deemed relevant is generated. A relevant entity includes an entity of interest for which tracking or determining entity associations is desired. Given a class image that represents a relevant entity, an image identifier comprising unique feature vectors for that class image is generated. Several image identifiers that correspond to the collection of class images are generated. Given an arbitrary web page, all the images embedded on the web page are analyzed. Each embedded image is compared to the image identifiers of the corpus of class images to determine whether or not any entities of interest appear in the embedded images of the web page. If relevant entities do appear on the web page, various associations can be made between the entities found on the page, and between the uniform resource locator (URL) of the web page where the entities appear.

Accordingly, in one aspect, the present invention is directed to one or more computer storage media having computer-executable instructions embodied thereon, that when executed, cause a computing device to perform a method for determining entity associations utilizing images. The method includes, generating a collection of class images where each class image of the collection of class images represents a relevant entity. A relevant entity is an entity of interest for which tracking entity associations is desired. The method also includes generating at least one image identifier for each class image, the at least one image identifier being a plurality of vectors representative of the relevant entity within each class image. The method further includes generating a plurality of image identifiers that correspond to the collection of class images and analyzing one or more embedded images on a web page to determine whether a class image occurs in any of the one or more embedded images by comparing the one or more embedded images to the plurality of generated image identifiers. Where a class image corresponds to at least one of the one or more embedded images on the web page, the method further includes associating the web page with the relevant entity represented by the class image.

In another aspect, the present invention is directed to one or more computer storage media having computer-executable instructions embodied thereon, that when executed, cause a computing device to perform a method for determining entity associations utilizing images. The method includes determining a plurality of URLs visited by an anonymous cookie and determining all relevant people entities associated with the plurality of URLs by comparing facial images embedded on the URLs with face image identifiers representative of a set of people for whom tracking entity associations is desired. The method also includes determining all relevant non-people entities associated with the plurality of URLs by comparing images embedded on the URLs with one or more image identifiers representative of class images of relevant non-people entities. The method further includes determining at least one face image identifier found most frequently amongst all relevant people entities and non-people entities associated with the plurality of URLs and utilizing heuristics to determine which face image identifier is associated with the anonymous cookie.

In yet another aspect, the present invention is directed to a computerized system for determining entity associations utilizing images, the system includes a processing unit; and a memory for storing computer-executable instructions that when executed by the processing unit executes: an image corpus component configured to create a body of class images representative of relevant entities, where relevant entities are people, places or things for which tracking entity associations is desired. The system also includes a face identifier component configured to detect faces within the body of class images and generate a plurality of vectors representative of summarized facial features of each face detected within the body of class images. The system further includes, a non-people entity identifier component configured to generate a non-people image identifier by creating a summarized representation of relevant non-people entities within the body of class images. The system also includes an image analyzer component configured to analyze one or more embedded images on a web page, to determine whether a class image occurs in any of the one or more embedded images and which relevant entities appear on the one or more embedded images. The system further includes an association component configured to associate the recognized relevant entities of the one or more embedded images of the web page with a URL of the web page on which the relevant entities appear.

Figure 1:
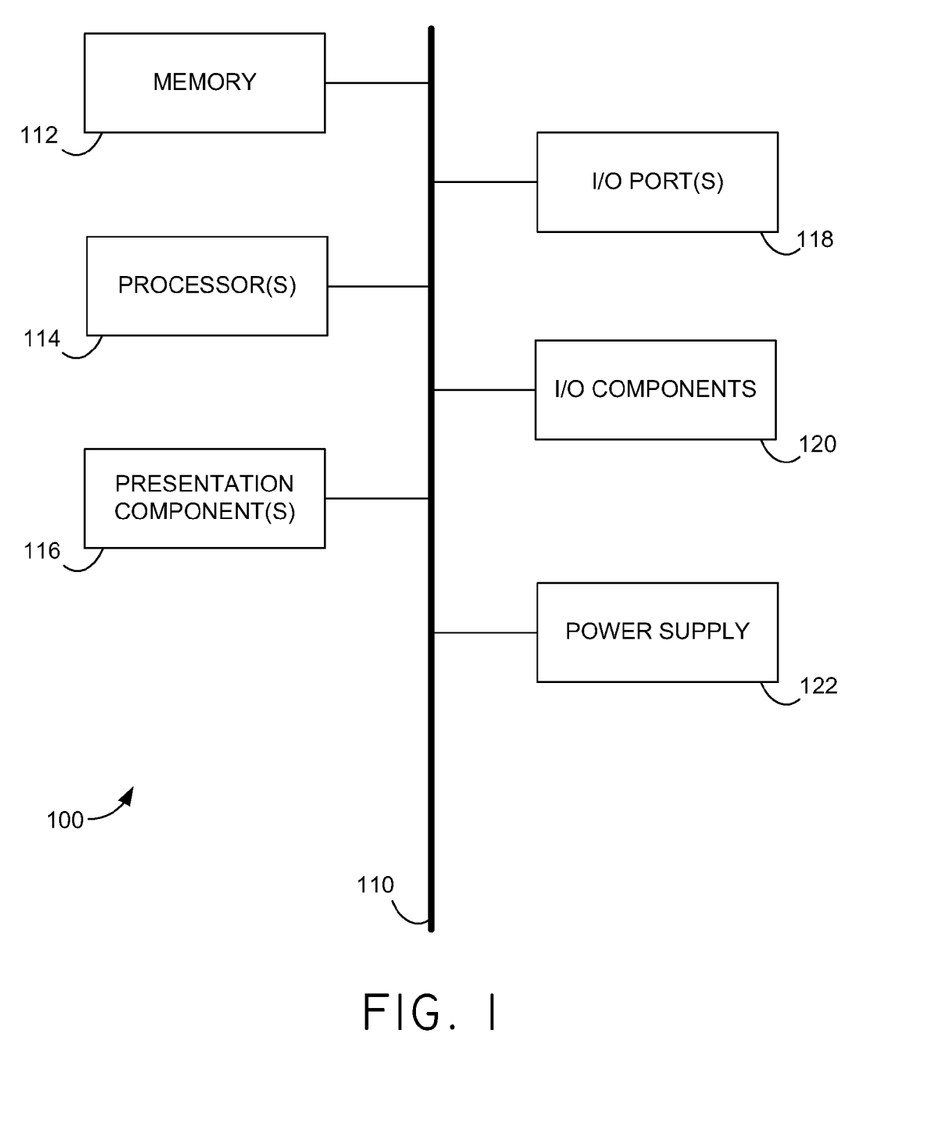
FIG. 1 is a block diagram of an exemplary computing system environment suitable for use in implementing embodiments of the present invention.

Having briefly described embodiments of the present invention, now described is FIG. 1 in which an exemplary operating environment for implementing embodiments of the present invention is shown and designated generally as computing device 100. Computing device 100 is but one example of a suitable computing environment and is not intended to suggest any limitation as to the scope of use or functionality of invention embodiments. Neither should the computing device 100 be interpreted as having any dependency or requirement relating to any one or combination of components illustrated.

Embodiments of the invention might be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention might be practiced in a variety of system configurations, including handheld devices, consumer electronics, general-purpose computers, more specialty computing devices, etc. Embodiments of the invention might also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and a power supply 122. Bus 110 represents what might be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

Computing device 100 typically includes a variety of computer-readable media. By way of example, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors 114 that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Embodiments of the present invention might be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 2:
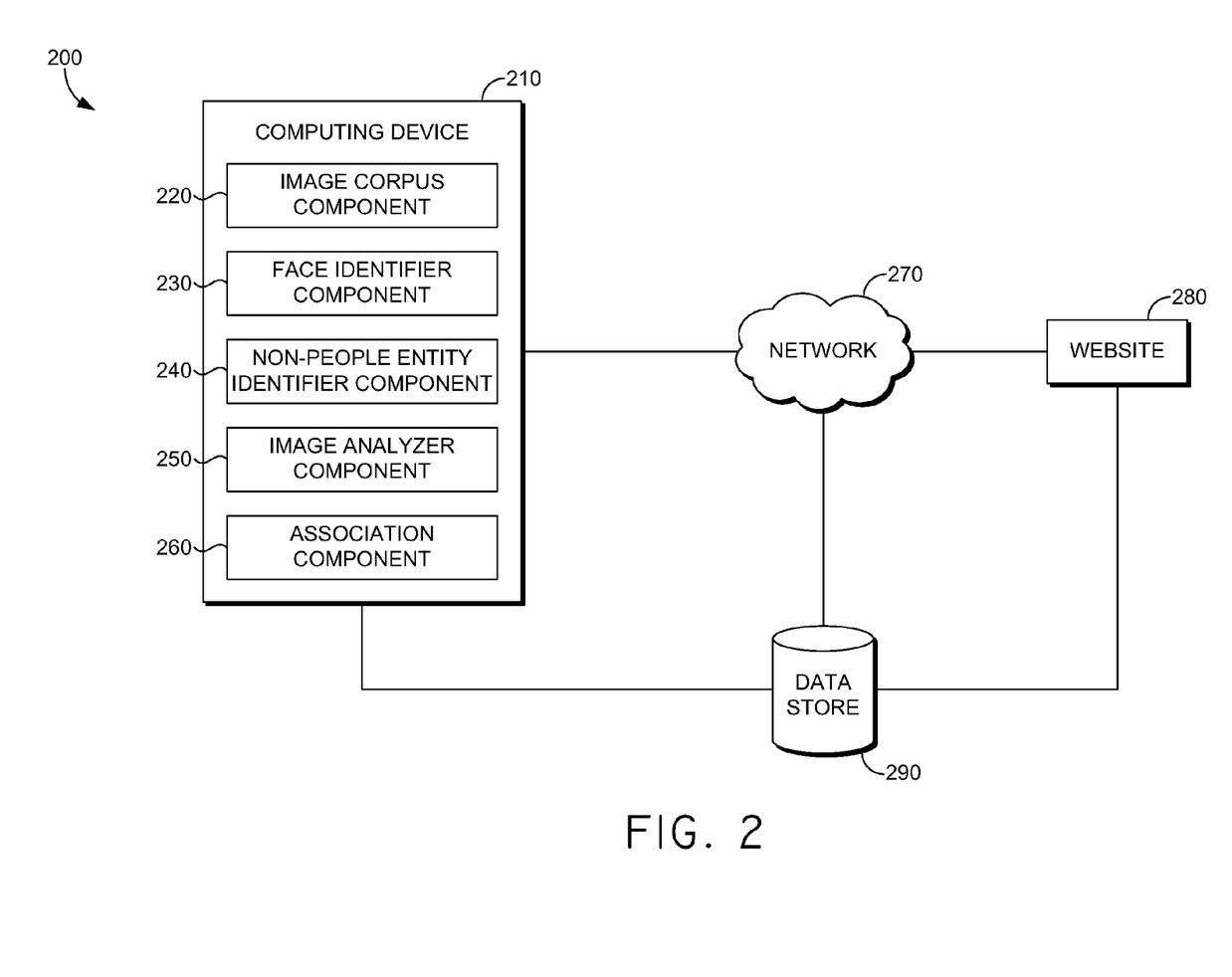
FIG. 2 is a block diagram of an exemplary system according to an embodiment of the present invention.

Turning now to FIG. 2, a block diagram is illustrated, in accordance with an embodiment of the present invention, showing a system 200 configured to for determining entity associations utilizing images. It will be understood and appreciated by those of ordinary skill in the art that the system 200 shown in FIG. 2 is merely an example of one suitable computing system environment and is not intended to suggest any limitation as to the scope of use or functionality of embodiments of the present invention. Neither should the system 200 be interpreted as having any dependency or requirement related to any single component or combination of components illustrated therein. Further, the system 200 may be provided as a stand-alone product, as part of a software development environment, or any combination thereof.

The system 200 includes one or more computing devices 210, one or more websites 280, and one or more data stores 290, all in communication with one another. Generally, components (e.g., image corpus component 220, face identifier component 230, non-people entity identifier component 240, image analyze component 250 and association component 260) of the exemplary system 200 may be interconnected by any method known in the relevant field. In embodiments, a network 270 is provided to facilitate communication between the components of computing devices 210, websites 280 and data stores 290. The network 270 may be wireless and may include, without limitation, one or more local area networks (LANs) and/or wide area networks (WANs). Such networking environments are commonplace in offices, enterprise-wide computer networks, intranets, and the Internet. The network 270 may also include private and public local networks, and wireless data or telephone networks. In addition, many more components (e.g., BTSs, devices, and the like) may be operably coupled to network 270.

The computing device 210 is any computing device, such as the computing device 100, that allows images to be used as online identifiers to link various entities and behaviors. For example, the computing device 210 might be a personal computer, a laptop, a server computer, a wireless phone or device, a personal digital assistant (PDA), among others. Additionally, the computing devices 210 may further include a keyboard, keypad, stylus, joystick, and any other input-initiating component that allows a user to access wired or wireless data on the network 270. It should be noted, however, that the present invention is not limited to implementation on such computing devices, but may be implemented on any of a variety of different types of computing devices within the scope of embodiments hereof.

In an embodiment of the present invention, computing device 210 utilizes images representative of various relevant entities to determine relationships between entities and URLs on websites 280 via network 270. Entities may include something in existence such as physical objects, locations, persons or other things referred to via a noun phrase. A relevant entity includes an entity of interest for which tracking or determining entity associations is desired. In some instances people entities are differentiated from non-people entities or things occurring in an image. For example, in a picture of a man and his dog posing at the Grand Canyon, two non-people entities and one people entity may be found. That is, the portion of the picture containing the face of the man may be associated with a people entity while the dog and physical location of the Grand Canyon may be identified as non-people entities.

The computing device 210 may include several components utilized in determining entity associations using images as identifiers. In an embodiment of the present invention, computing device 210 may include image corpus component 220, face identifier component 230, non-people entity identifier component 240, image analyze component 250 and association component 260. Image corpus component 220 may be configured to create a body or corpus of class images that are representative of relevant entities for which tracking entity association is desired. The image corpus component 220 may create the body of class images by crawling several websites 280 and extracting class images from the websites 280. In other instances, the collection of class images in the image corpus may be acquired in other ways. For instance, in the case of people, photographs such as headshots or portraits of people may be used as a class image. In the case of non-people entities, class images representative of the entities may be derived from stock photos. For example, a common picture of a landmark or a stock photo of a particular car model may be used to represent the landmark entity or car model entity in the image corpus.

Face identifier component 230 of computing device 210 may be configured to detect faces within each image of the body of class images. Provided a face is detected in a class image, face identifier component 230 may generate a face image identifier comprising a set of vectors representative of summarized facial features of each face detected within the class image. Face identifier component 230 may determine using known facial detection technologies the presence of a face of a person in the class image. Face identifier component 230 may also determine using known facial detection technologies the location where the face image exists within a particular class image. In embodiments, no personally identifiable information is stored by face identifier component 230, instead only the vector information as a result of the facial recognition is used to generate the face image identifier. In one embodiment, the vector data representing a person's face may be hashed to prevent reconstruction of the facial image from the vector data. In instances where a picture in the image corpus includes multiple faces in the same picture, face identifier component 230 may construct vectors representative of each face within the picture.

Similarly for non-people entities within a class image of the image corpus, non-people entity identifier component 240 may be configured to generate a non-people image identifier by creating a summarized representation of the relevant non-people entities within the class image. The non-people image identifier may include representative vectors for a given class image. By way of example, class image involving a stock photo of a particular car model may be encoded into a vector by non-people entity identifier component 240. The generated image identifier may be used to represent all instances of the non-people entity. For instance, the encoded vector representing the particular car model may be used to represent all instances of the particular class of car model.

Given any web page of websites 280 the presence of entities on that web page may be determined by examining the images on the page and determining whether or not any images match a known entity that exists in image corpus of relevant entities. The image analyzer component 250 of computing device 210 may be configured to analyze the embedded images on a web page of website 280. In particular, image analyzer component 250 may determine whether a class image occurs in any of the embedded images of the web page by comparing the embedded images to the image identifiers generated by face identifier component 230 and non-people entity identifier component 240. Image analyzer component 250 may further determine which relevant entities appear on the web page.

Provided relevant entities do appear on a web page of a website 280, the association component 260 of computing device 210 may be configured to associate the recognized relevant entities of the embedded images of the web page with the URL of the web page on which the relevant entities appear. Association component 260 may generate an image identifier to uniform resource locator (URL) pair, in which the image identifier to uniform resource locator pair presents an anonymous identifier (vector or hash of the vector) for the relevant entity and the URL of the web page where the entity appears. Upon image analyzer component 250 determining the instances of relevant entities within the embedded images of a webpage, association component 260 may perform various associations in addition to image identifier to uniform resource locator associations. For example, association component 260 may generate image identifier to image identifier pairs for entities (persons or things) that appear in the same images or on the same web page. Using image identifier to image identifier pairs, association component 260 may associate entities to other entities. For instance, an image identifier corresponding to a particular face may be associated with other relevant people entities located on the web page. Furthermore, association component may associate relevant people entities with any relevant non-people entities occurring on the images of the web page. As such the non-people entity identifiers may be used to provide information about the interests of the people entities associated with a webpage. The relevant non-people entities of the web page may also be associated with other relevant non-people entities.

Association component 260 may further determine the relative strength between relationships of relevant entities. By way of example only and not limitation, association component may utilize a single value decomposition or random walk algorithm to determine the closeness of the relationship between non-people entities occurring on a web page. Similarly, association component 260 may determine the closeness of relationships between entities and URLs using various algorithms. In embodiments, association component 260 may be configured to associate the recognized relevant people entities on a web page with an existing anonymous cookie. In the case of a relevant people entity represented via a face image identifier, association component 260 may associate an anonymous cookie with the face image identifier by observing for a given cookie, which face image identifiers appear the most frequently on pages that that cookie visits.

By way of example only and not limitation, provided a cookie-12345 visits URL1, URL2 . . . URL-N, association component 260 may tally the counts for the various faces that show up in those URLs. Association component 260 may also examine all counts of each face represented by a unique face image identifier, to determine a probability estimate of seeing that face. The probability of seeing a particular cookie given a particular face (indicating that the cookie and the face are the same) may then be determined. Association component 260 may then iterate over all faces for a given cookie to determine the face having the highest probability of occurrence given a particular cookie, thereby associating a face to a cookie.

Furthermore, association component 260 may determine the other relevant people entities that co-occur with the face image identifier and by proxy, may associate entities with those people entities and via the above process with anonymous cookies as well. Given a cookie, association component 260 can determine the face it maps to via face image identifiers. Then, by looking up the face, association component 260 may examine all the URLs associated with that face from an image identifier to URL mapping, thereby creating cookie to URL mappings. Similar to the cookie to URL mapping, association component 260 can determine the face for a cookie and then determine all image identifiers associated with that face to generate cookie to image identifier mappings.

Figure 3:
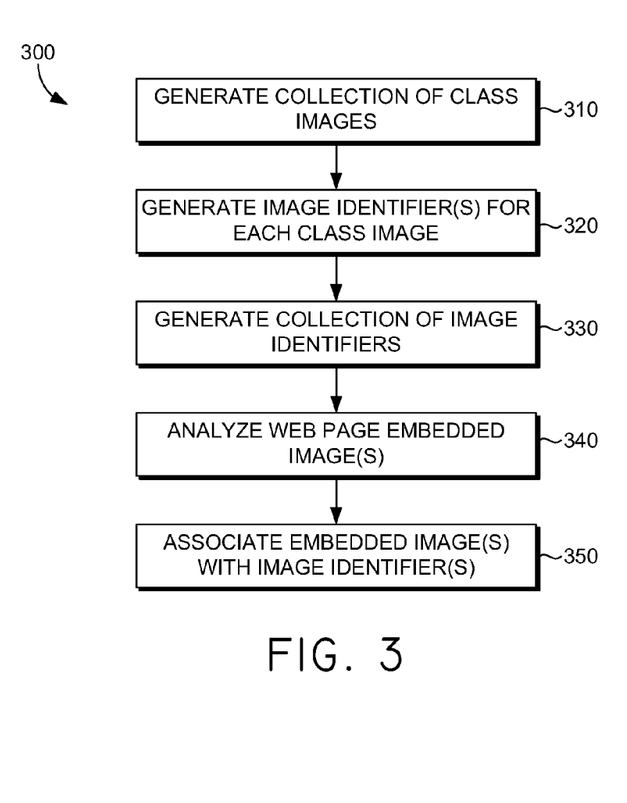
FIG. 3 is a flow diagram of an exemplary method of determining entity associations utilizing images, according to an embodiment of the present invention.

Turning now to FIG. 3, a flow diagram is illustrated showing a method 300 for determining entity associations utilizing images, in accordance with an embodiment of the present invention. As shown at block 310, a collection of class images is generated, for instance, by an image corpus component 220 of the computing device 210 of FIG. 2. Each class image of the collection of class images may represent a relevant entity. A relevant entity may comprise a person, place or thing of interest for which tracking entity associations is desired. As shown at block 320, at least one image identifier for each class image within the collection of class images is generated. An image identifier may comprise a plurality of vectors that represent the relevant entity within a class image. Image identifiers may be generated for both people entities and non-people entities. A collection of image identifiers that correspond to the collection of class images is generated as shown at block 330. The collection of image identifiers may be generated, for instance, by a face identifier component 230 and/or non-people entity identifier component 240 of the computing device 210 of FIG. 2. As shown at block 340, one or more embedded images on a web page are analyzed to determine whether a class image occurs in any of the embedded images, for instance, by image analyzer component 250 of the computing device of FIG. 2. The embedded images of the web page may be analyzed by comparing the embedded images of the web page to the collection of image identifiers. If a class image corresponds to an embedded image on the web page, the web page is associated with the relevant entity represented by the class image, for instance by association component 260 of the computing device of FIG. 2, as indicated at block 350. That is, at block 350 the recognized relevant entities of the embedded images of the web page are associated with the URL of the web page on which the relevant entities appear.

Figure 4:
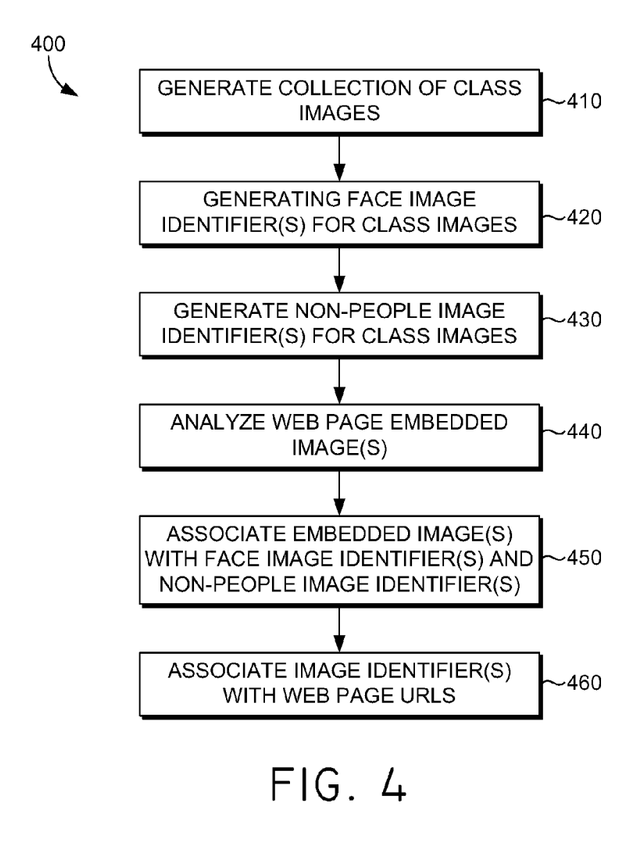
FIG. 4 is a flow diagram of another exemplary method of determining entity associations utilizing images, according to an embodiment of the present invention.

With reference to FIG. 4, a flow diagram is illustrated showing another method 400 for determining entity associations utilizing images, in accordance with an embodiment of the present invention. As shown at block 410, a collection of class images is generated, for instance, by an image corpus component 220 of the computing device 210 of FIG. 2. Each class image of the collection of class images may represent a relevant entity. A relevant entity may comprise a person, place or thing of interest for which tracking entity associations is desired. As shown at block 420, at least one face image identifier for each class image containing a facial image, within the collection of class images is generated. A face image identifier comprises a set of vectors representative of summarized facial features of a facial image in a class image. The at least one face image identifier may be generated, for instance, by a face identifier component 230 of the computing device 210 of FIG. 2. One or more non-people image identifier(s) is generated for class images of the collection of class images, as indicated at block 430. A non-people image identifier may be generated by creating a summarized representation of relevant non-people entities within the body of class images, for instance, by a non-people identifier component 240 of the computing device 210 of FIG. 2. As shown at block 440, one or more embedded images on a web page are analyzed to determine whether a class image occurs in any of the embedded images, for instance, by image analyzer component 250 of the computing device of FIG. 2. The embedded images of the web page may be analyzed by comparing the embedded images of the web page to the generated face image identifiers and non-people image identifiers of the collection of class images. If a class image corresponds to an embedded image on the web page, the web page is associated with the relevant entity represented by the class image, for instance by association component 260 of the computing device of FIG. 2, as indicated at block 450. As shown at block 460, the recognized image identifiers of the embedded images of the web page are associate with the URL of the web page on which the relevant entities appear.

Figure 5:
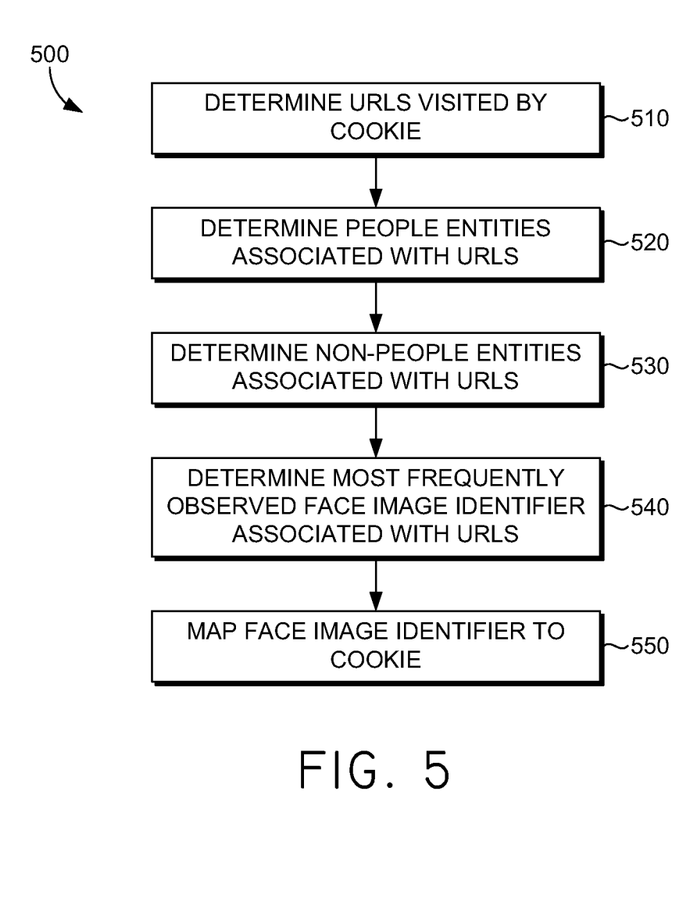
FIG. 5 is a flow diagram of an exemplary method determining entity associations utilizing images, according to an embodiment of the present invention.

With reference to FIG. 5, a flow diagram is illustrated showing a method 500, for determining entity associations utilizing images, in accordance with an embodiment of the present invention. In particular, method 500 illustrates a method for associating relevant entities with an anonymous cookie, for instance, by association component 260 of the computing device 210 of FIG. 2. As shown at block 510, the set of URLs visited by an anonymous cookie is determined. As shown at block 520, the relevant people entities associated with the plurality of URLs are determined. The relevant people entities associated with the set of URLs may be determined by comparing facial images embedded on the URLs with face image identifiers representative of a set of people for whom tracking entity associations is desired. Face image identifiers include a plurality of vectors representative of summarized facial features of a relevant person entity. In particular, determining relevant people entities associated with the plurality of URLs includes determining using face detection the presence of facial images embedded on the URLs, and for each embedded facial image determining if the facial image matched any face image identifiers of a collection of face images deemed relevant. The collection of face images may include a plurality of portraits of people. As shown at block 530, the non-people entities associated with the set of URLs are determined. The relevant non-people entities associated with the set of URLs may be determined by comparing images embedded on the URLs with image identifiers representative of class images of relevant non-people entities. The most frequently observed face image identifier associated with the set of URLs is determined, for instance by association component 260 of the computing device 210 of FIG. 2, as indicated at block 540. Various heuristics are utilized to determine which face image identifier is associated with the anonymous cookie, as indicated at block 550. By way of example, all the images uploaded by the anonymous cookie may be analyzed to determine the most frequently occurring face image identifier occurring in the uploaded images and associating that face identifier with the anonymous cookie. In another example, where an image containing a particular face image identifier is chosen as a profile picture for a particular user, the face image identifier may be associated with the cookie of the user.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in the method 300 of FIG. 3, the method 400 of FIG. 4 and the method 500 of FIG. 500 are not meant to limit the scope of the present invention in any way and, in fact, the steps may occur in a variety of different sequences within embodiments hereof. Any and all such variations, and any combination thereof, are contemplated to be within the scope of embodiments of the present invention.

The present invention has been described in relation to particular embodiments, which are intended in all respects to be illustrative rather than restrictive. Alternative embodiments will become apparent to those of ordinary skill in the art to which the present invention pertains without departing from its scope.

What is claimed is:

1. One or more computer storage media devices having computer-executable instructions embodied thereon that, cause the one or more computer storage media devices to perform a method for determining entity associations utilizing images, the method comprising:
   generating a collection of class images wherein each class image of the collection of class images represents a relevant entity, the relevant entity being an entity of interest for which tracking entity associations is desired;
   generating at least one image identifier for each class image, the at least one image identifier being a plurality of vectors representative of the relevant entity within each class image;
   generating a plurality of image identifiers that correspond to the collection of class images;
   analyzing one or more embedded images on a web page to determine whether a class image occurs in any of the one or more embedded images by comparing the one or more embedded images to the plurality of generated image identifiers;
   if a class image corresponds to at least one of the one or more embedded images on the web page, associating the web page with the relevant entity represented by the class image; and
   associating at least one of the one or more embedded images of the web page that corresponds to a class image with at least one other embedded image of the web page that also corresponds to a class image.

2. The one or more computer storage media devices of claim 1, wherein the method further comprises generating an image identifier to uniform resource locator (URL) pair, wherein the image identifier to uniform resource locator pair associates the plurality of vectors for the relevant entity with the URL of the web page where the relevant entity appears.

3. The one or more computer storage media devices of claim 1, wherein the collection of class images comprises pictures of at least one of people, places or things.

4. The one or more computer storage media devices of claim 1, wherein generating the collection of class images comprises crawling a plurality of web pages and extracting class images from the plurality of web pages.

5. The one or more computer storage media devices of claim 1, wherein the one or more embedded images on the web page corresponds to multiple class images of the collection of class images and multiple relevant entities.

6. The one or more computer storage media devices of claim 2, wherein generating at least one image identifier for each class image comprises:
   generating a face image identifier by determining using face detection the presence of a face of a user in the class image; and
   storing a plurality of vectors representing the user's face.

7. The one or more computer storage media devices of claim 6, wherein generating at least one image identifier for each class image comprises generating a non-people image identifier by creating a summarized representation of relevant non-people entities within the class image.

8. The one or more computer storage media devices of claim 7, wherein the method further comprises:
   determining for the web page all the relevant people and non-people entities associated with the URL of the web page; and
   associating the face image identifiers found on the URL with the non-People image identifiers found on the URL of the web page.

9. The one or more computer storage media devices of claim 8, wherein the method further comprises associating the non-people image identifiers found on the URL of the web page with one another.

10. The one or more computer storage media devices of claim 8, wherein the method further comprises mapping the face image identifiers found on the URL of the web page with an anonymous cookie associated with the URL.

11. One or more computer storage media devices having computer-executable instructions embodied thereon that, cause the one or more computer storage media devices to perform a method for determining entity associations utilizing images, the method comprising:
   determining a plurality of URLs visited by an anonymous cookie;
   determining all relevant people entities associated with the plurality of URLs by comparing facial images embedded on the URLs with face image identifiers representative of a set of people for whom tracking entity associations is desired;
   determining all relevant non-people entities associated with the plurality of URLs by comparing images embedded on the URLs with one or more image identifiers representative of class images of relevant non-people entities;
   determining at least one face image identifier found most frequently amongst all relevant people entities and non-people entities associated with the plurality of URLs;
   utilizing heuristics to determine which face image identifier is associated with the anonymous cookie; and
   determining all URLs and entities mapped to the face image identifier associated with the anonymous cookie.

12. The one or more computer storage media device of claim 11, wherein the method further comprises associating with the anonymous cookie all the URLs and entities mapped to the face image identifier.

13. The one or more computer storage media devices of claim 11, wherein the face image identifier comprises a plurality of vectors representative of summarized facial features of a person belonging to the set of people for whom tracking entity associations is desired.

14. The one or more computer storage media devices of claim 11, wherein determining all relevant people entities associated with the plurality of URLs comprises:
   determining using face detection the presence of facial images embedded on the URLs; and
   for each embedded facial image determining if the facial image matched any face image identifiers of a collection of face images.

15. The one or more computer storage media devices of claim 14, wherein the collection of face images comprises a plurality of portraits of people.

16. A computerized system for determining entity associations utilizing images, the system comprising:
   a processing unit; and
   a memory for storing computer-executable instructions that when executed by the processing unit executes:
      an image corpus component configured to create a body of class images representative of relevant entities, wherein relevant entities are people, places or things for which tracking entity associations is desired;
      a face identifier component configured to detect faces within the body of class images and generate a plurality of vectors representative of summarized facial features of each face detected within the body of class images;
      a non-people entity identifier component configured to generate a non-people image identifier by creating a summarized representation of relevant non-people entities within the body of class images;
      an image analyzer component configured to analyze one or more embedded images on a web page, to determine whether a class image occurs in any of the one or more embedded images and which relevant entities appear on the one or more embedded images; and
      an association component configured to associate the recognized relevant entities of the one or more embedded images of the web page with a URL of the web page on which the relevant entities appear and to associate the recognized relevant entities with an existing anonymous cookie.

17. The system of claim 16, wherein the body of class images is created by crawling a plurality of web pages and extracting class images from the plurality of web pages.

* * * * *